United States Patent
Natu et al.

(10) Patent No.: US 7,080,244 B2
(45) Date of Patent: Jul. 18, 2006

(54) SYSTEM AND METHOD FOR CONFIGURING HARDWARE DEVICES USING A MENU FOR PLATFORMS WITH EFI AND LEGACY OPTION-ROMS

(75) Inventors: Mahesh S. Natu, Portland, OR (US); Michael A. Rothman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 10/660,403

(22) Filed: Sep. 10, 2003

(65) Prior Publication Data

US 2004/0193738 A1   Sep. 30, 2004

Related U.S. Application Data

(63) Continuation-in-part of application No. 10/395,729, filed on Mar. 24, 2003.

(51) Int. Cl.
*G06F 9/24* (2006.01)
*G06F 9/445* (2006.01)

(52) U.S. Cl. .............................................. 713/1; 713/2
(58) Field of Classification Search .................... 713/1, 713/2
See application file for complete search history.

(56) References Cited

U.S. PATENT DOCUMENTS

| | | | |
|---|---|---|---|
| 6,513,114 B1 * | 1/2003 | Wu et al. | 713/2 |
| 6,961,791 B1 * | 11/2005 | Cepulis | 710/104 |
| 6,971,003 B1 * | 11/2005 | Mahmoud | 713/2 |

\* cited by examiner

*Primary Examiner*—Lynne H. Browne
*Assistant Examiner*—Stefan Stoynov
(74) *Attorney, Agent, or Firm*—Joni D. Stutman-Horn

(57) ABSTRACT

A system and method for configuring devices during pre-boot in a computer system which may have both legacy and EFI compatible option-ROMs. EFI versions of the Option-ROMs export a callable interface that can be invoked to execute the configuration utility. A hardware independent piece of software lists all the hardware devices in a single menu and allows the user to invoke the configuration utility for the appropriate hardware device(s).

19 Claims, 3 Drawing Sheets

SYSTEM AND METHOD FOR CONFIGURING HARDWARE DEVICES USING A MENU FOR PLATFORMS WITH EFI AND LEGACY OPTION-ROMS

CROSS-REFERENCE TO RELATED APPLICATIONS

This application is a Continuation-in-Part Application to U.S. patent application Ser. No. 10/395,729, (Attorney Docket No. 20002/15808), entitled, "Methods And Apparatus To Export Information," filed on Mar. 24, 2003 by Michael A. Rothman, et al., assigned to a common assignee, the entire subject matter which is herein incorporated by reference.

FIELD OF THE INVENTION

An embodiment of the present invention relates generally to computer start up, and, more specifically, to configuring devices during pre-boot.

BACKGROUND INFORMATION

Processor-based systems, such as personal computers, typically include a motherboard on which a main processor and memory are disposed. Additionally, the motherboard includes a number of slots into which peripherals, or devices, may be installed, for instance, as add-in cards. For example, a personal computer may include peripherals such as a hard drive controller, a display or graphics adapter, a network adapter and a modem, each of which is usually provided by an independent hardware vendor (IHV) and each of which is installed into a slot on the motherboard or is in communication with the motherboard through other means (e.g., a cable connection).

Each peripheral associated with the processor system typically includes a memory portion, commonly referred to as an option read only memory (option-ROM) that stores configuration or operation information and data for the peripheral. Typically, user configuration of peripherals, or review of versioning information stored in the option-ROM, is available during boot up of the main processor through the use of configuration utilities associated with each peripheral. In systems of the prior art, each configuration utility is accessed by user actuation of specific key sequence that is specified by IHVs. For example, a disk drive controller IHV may enable a user to access its configuration utility to review versioning information in the option-ROM of the disk drive controller if a user presses the F1 key after the splash screen for the disk drive controller manufacturer is displayed. This splash screen is displayed to the user during initialization of the controller by the processor. Due in part to lack of standardization, it is rare that configuration information for two peripherals is accessed in the same manner. Accordingly, a user seeking to review or alter the configuration information for a peripheral must actuate the appropriate key sequence for the peripheral at a particular point in time.

As computing systems become more complex and the number of peripherals to be configured grows, more time, in aggregate, is required to allow users to access the various configuration utilities of the peripherals via hot keys. However, in many instances, operating system (OS) software vendors specify a maximum period of time, such as, for example, seven seconds, between processor power-up and when the processor begins to boot the OS. Accordingly, while there are generally more peripherals to be configured, the time allotted to access the configuration utilities of such peripherals must be fit within the required timeframe. As the number of peripherals to be configured increases and the specified time between processor power-up and OS boot stays fixed, the window of time in which a user can access the configuration information of a particular device decreases. A user desiring to configure a peripheral must watch screen messages as a system boots and intervene with the proper key sequence at the appropriate time. In practical effect, the window for actuating the proper key sequence is small and may require one or more subsequent re-boots to enable a user to actuate the appropriate key sequence within the appropriate window of time. This situation is less than optimal, as the user may become frustrated when numerous attempts are made to access the configuration information of a particular peripheral.

Since the option-ROM space is limited, the user may be required to disable some other option-ROMs or remove cards to make sure the required option-ROM can actually run.

BRIEF DESCRIPTION OF THE DRAWINGS

The features and advantages of the present invention will become apparent from the following detailed description of the present invention in which.

DETAILED DESCRIPTION

Figure 1:
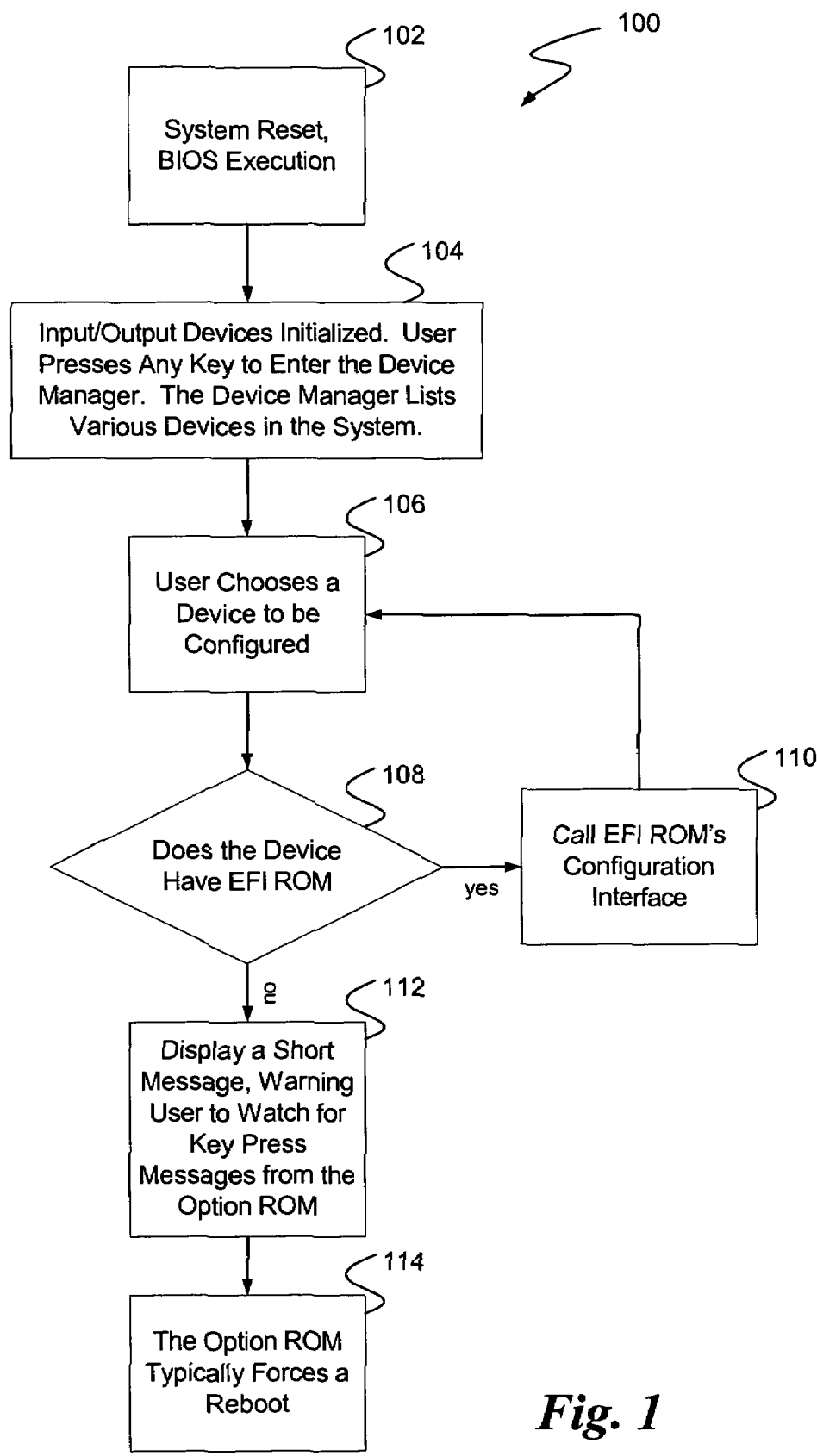
FIG. 1 is a flow diagram of an exemplary method for running device configuration utilities using a common menu.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Newer systems utilizing the extensible firmware interface (EFI) according to, for instance, the EFI 1.1 Specification (available at http://developer.intel.com/technology/efi), address this problem by allowing the EFI version of the option-ROMs to export a callable interface that can be invoked to execute the configuration utility. This allows a hardware independent piece of software to list all the hardware devices in a single menu (called "Device Manager" from this point on) and allows the user to invoke the configuration utility for the appropriate hardware device(s). A preferred Device Manager for EFI devices is described in U.S. patent application Ser. No. 10/395,729, entitled, "Methods And Apparatus To Export Information", filed on Mar. 24, 2003 by Michael A. Rothman, et al. (hereafter, "Rothman 2003").

The system and method described herein improves on Rothman 2003 because it enables the user to easily configure both devices with EFI option-ROMs and devices with legacy option-ROMs from a same menu.

Industry-wide transition to EFI only option-ROMs may take several years. In the meantime, the systems will have both EFI and non-EFI option-ROMs. The system and method described herein proposes a method for using the "Device Manager" concept for such hybrid systems by including the non-EFI option-ROMs in the configuration menu, as well as the EFI option-ROMs. The devices that are controlled by non-EFI option-ROMs are also listed in the Device Manager. Allowing the user to launch configuration of all the hardware devices from within Device Manager is helpful because the user is mostly unaware of whether a device is controlled by a non-EFI option-ROM or an EFI option-ROM (and typically does not care). Since non-EFI option-ROMs do not make a callable interface available, as do EFI option-ROMs, the only way to launch the configuration utility is to launch the option-ROM from within the Device Manager. In the case of non-EFI ROMs, the user will be required to press the predefined specific key sequence to get inside the configuration utility, during execution of the device's option-ROM. Although this is not quite the same as automatic entry provided by EFI ROMs, the "one menu" concept is still very appealing for users due to the centralized location of all configuration opportunities. The Device Manager can be entered before any option-ROM (except the Video, which does not have any configuration utility) is executed and therefore, it is almost certain that there will be sufficient space to launch the option-ROM for the device to be configured.

FIG. 1 is a flow diagram of an exemplary method 100 for running device configuration utilities using a common menu. The system is reset in block 102. For personal computer (PC) architecture, the reset typically involves loading and running a basic input/output system (BIOS). The BIOS will search for devices and read and execute option-ROM code corresponding to the identified devices, in block 104. When the user wants to run a configuration utility for one or more devices, for instance to configure a RAID (redundant array of independent disks) or network interface card (NIC), a key is pressed during system reset to launch the "Device Manager." The Device Manager creates a menu of configurable devices and displays the list to the user. It will be apparent to one of ordinary skill in the art that this menu may be implemented in a variety of different ways, as long as the user is given the opportunity to indicate selection of one or more of the menu items.

The user selects a device from the menu in block 106. If the device has an EFI option-ROM, as determined in decision block 108, then the EFI option-ROM configuration interface is called (executed) by the Device Manager in block 110, giving the user the opportunity to configure the device. This is possible because the EFI option-ROMs have a callable interface. Once the EFI device configuration is complete, the menu is then redisplayed, in block 106, allowing the user to configure another device. In rare instances, configuration of an EFI device will force another restart, as described for non-EFI devices, below. When all of the desired devices have been reconfigured, the user selects an option to continue with the system restart. In an alternative embodiment, the menu is displayed for a fixed time. When the time interval expires, the system may automatically reboot. In some embodiments, a warning message is displayed prior to continuation of the reboot.

If the option-ROM is not EFI compatible (i.e., legacy option-ROM), then a short message is displayed to warn the user to be on the look-out for a prompt message to press the appropriate key sequence in order to run the configuration utility, in block 112. Reset continues with the execution of the selected device's option-ROM. When the prompt is displayed, the user presses the appropriate key sequence in order to launch the legacy configuration utility. For legacy option-ROMs, running the configuration utility often forces a reboot, in block 114. If additional devices are to be configured, the user will press a key to enter the Device Manager and processing continues with block 104. Otherwise, the user will allow the system to reboot without interruption.

In an alternate embodiment, it is possible to emulate the automated entry of the appropriate key sequence by the Device Manager while launching the legacy option-ROM. Most IHVs have defined specific key sequences that work on all of their products and it is possible to push the correct keys based on the PCI (peripheral component interconnect) vendor ID of a hardware device. For example, all option-ROMs from Adaptec® Inc. use the key combination control-A, for uniformity, and the Device Manager is capable of pushing that key combination while an option-ROM from Adaptec is launched (PCI Vendor ID=0x9005). This emulation of a key sequence may be done in either hardware or software. The option-ROM calls the system BIOS to check if a key has been pressed via a software interrupt call (int 16). The Device Manager is a system BIOS module and can work with the module that services int 16 to return this key. It is also possible for device manager to push the key sequence to the actual hardware. A standard PS2 keyboard controller supports this functionality.

The approach described herein provides one user interface (UI) to configure non-EFI option-ROMs with the EFI option-ROMs and allows users to move configure their systems in an EFI-like fashion. The current method of pressing the key sequence during non-EFI option-ROM execution will still continue to operate.

Figure 2:
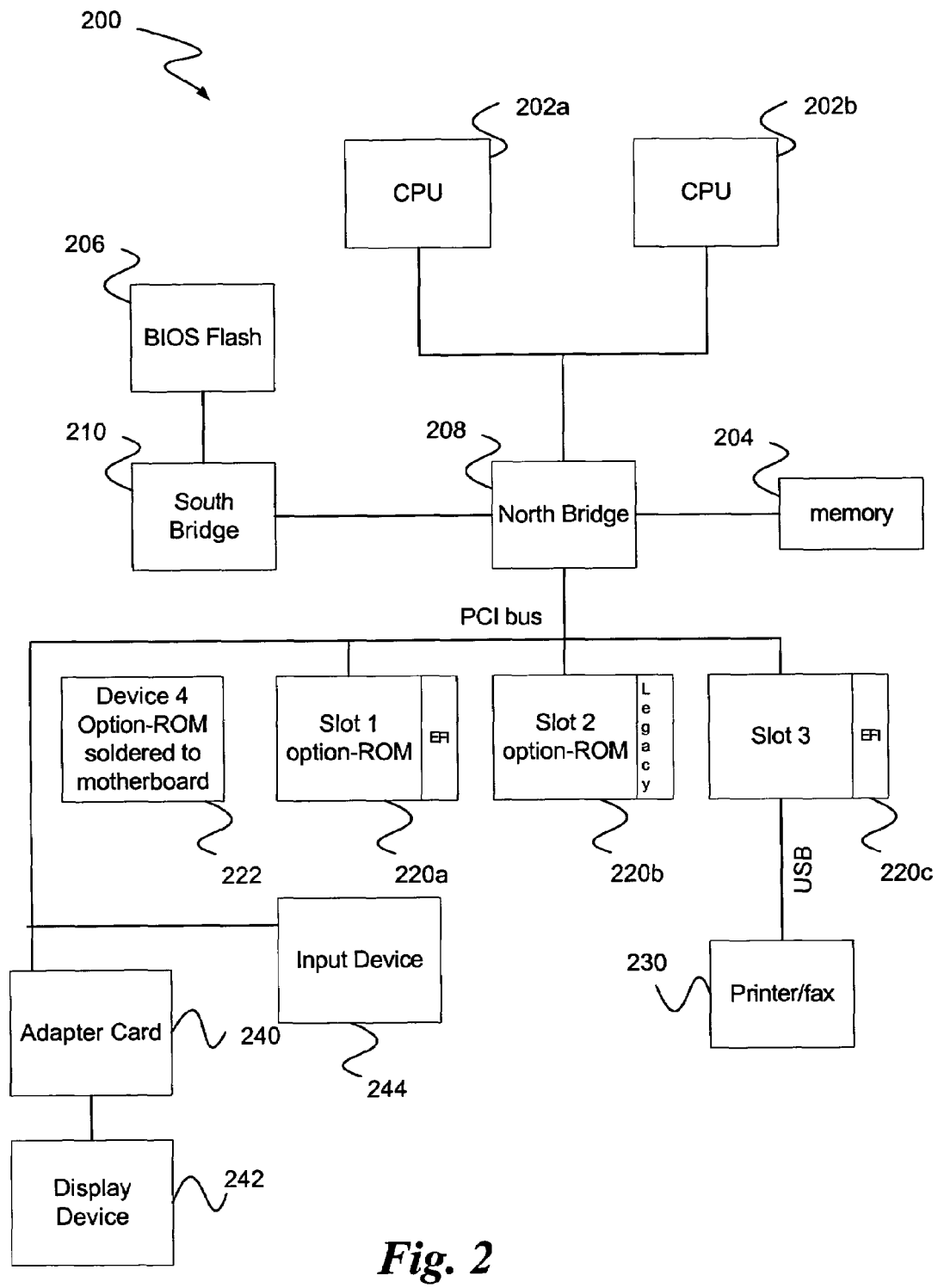
FIG. 2 is a block diagram of an exemplary computer system environment in which the present system and method can be used.

Referring now to FIG. 2, there is shown a block diagram of an exemplary computer system environment 200 in which the present system and method can be used. An exemplary computer system 200 has at least one processor 202 communicatively coupled with system memory 204 and a boot up non-volatile memory device 206. In one embodiment, the system memory is random access memory (RAM) and the non-volatile boot up memory is flash memory accessible via the south bridge 210. It will be apparent to one of ordinary skill in the art that other forms of memory may be substituted for the RAM and flash memories. The processor 202 is operatively connected to at least one device 220 via a north bridge 208. In one embodiment, a device 222 may be soldered directly to the motherboard, also communicating to the processor 202 via the north bridge 208. Slots 1, 2 and 3 have add-in cards 220 having option-ROMs. Slot 1 220a contains a card having an EFI option-ROM. Slot 2 220b contains a card having a legacy option-ROM. Slot 3 contains a card compatible with EFI, but without an option-ROM (needing no configuration utility). For instance, in one embodiment, slot 3 has a universal system bus (USB) card 220c connected to a printer/fax combination device 230.

In an exemplary embodiment, a display device 242 is operatively connected to the computer system via an adapter card 240. The display device 242 is used by the user to view set up menus, and the like. An input device 244 is also operatively connected to the computer system to be used for entering key sequences during pre-boot and to provide user or operator input during device configuration.

During boot, a user may desire to configure one or more of the devices having an option-ROM. For instance, the card in slot 2 may be newly added to the system and not yet configured. In another case, the entire system may be new, requiring all devices to be properly configured.

Figure 3:
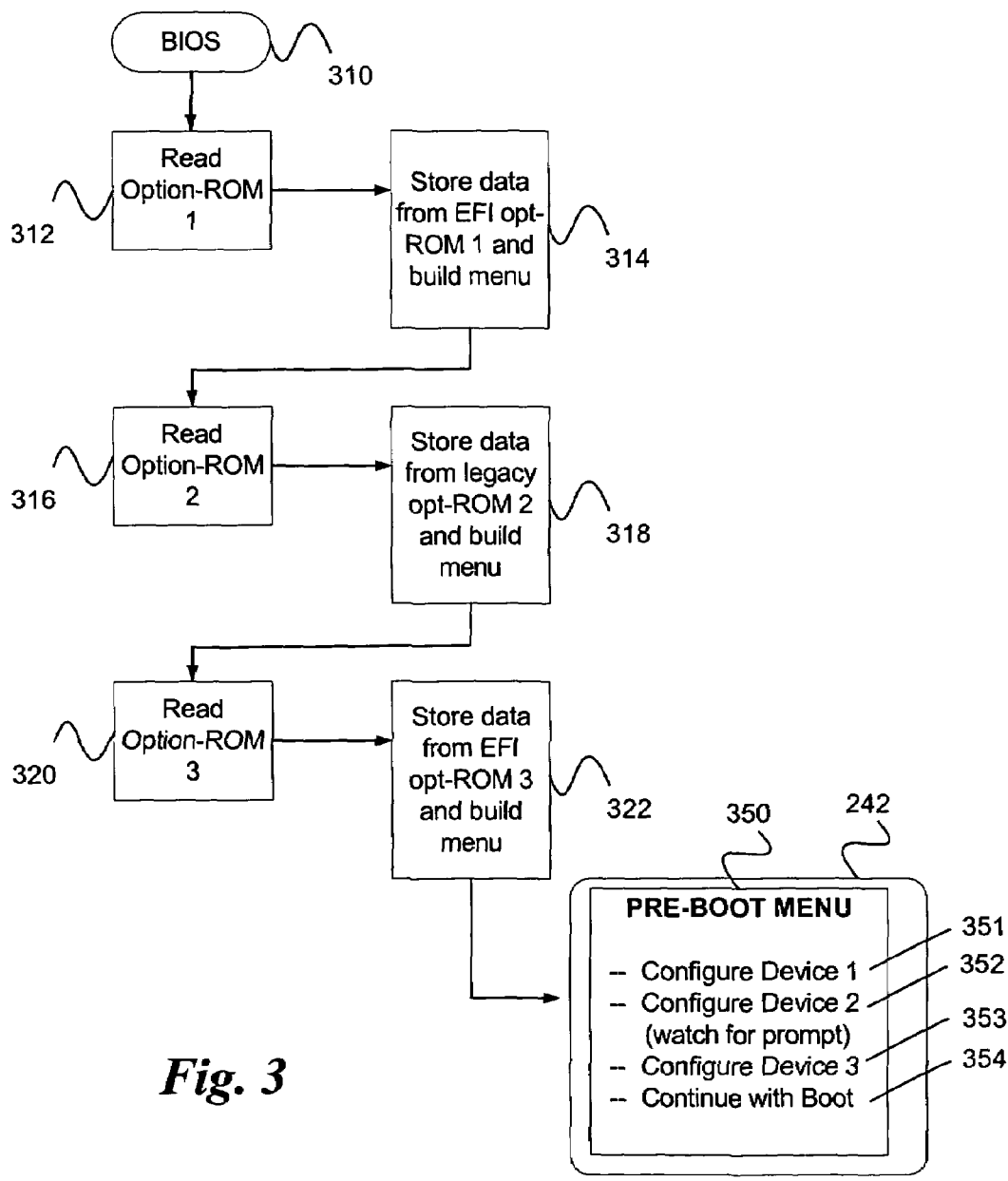
FIG. 3 is an exemplary process for displaying a pre-boot menu.

Referring now to FIG. 3, there is shown an exemplary process for displaying a pre-boot menu 350 on a display device 242 to provide a more user friendly interface during pre-boot. In this example, the system has three add-in cards 302, 304, 306 for devices with option-ROMs. Cards 1 and 3 302, 306 have EFI compatible option-ROMs. Card 2 304 has a legacy option-ROM.

During pre-boot of this exemplary system, the BIOS 310 identifies that there are three option-ROMs to execute for cards 1–3 302, 304, 306. The option-ROM for card 1 is read in block 312. The data from this option-ROM is stored in memory and a menu item is built to correspond with the configuration utility for this device, in block 314. The option-ROM for card 2 is read in block 316. The data from this option-ROM is stored in memory and a menu item is built to correspond with the configuration utility for this device, in block 318. The option-ROM for card 3 is read in block 320. The data from this option-ROM is stored in memory and a menu item is built to correspond with the configuration utility for this device, in block 322. Once all of the option-ROMs have been identified and read, the menu is complete. A menu 350 for this exemplary system has items for selecting a configuration utility for each EFI-compatible device, and warning items for each legacy device. For instance, in one embodiment, the first menu item 351 allows the user to configure the first device 302. The second menu item 352 warns the user to watch for the prompt if this is selected. In this embodiment, the user must enter the required key sequence, when prompted, in order to run the configuration utility for legacy device 2 304. The third menu item 353 allows the user to configure the third device 306. In this example, a fourth menu item 354 allows the user to continue with the pre-boot without configuring additional devices.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for configuring hardware devices in a pre-boot environment, the method comprising:
    initializing a peripheral device in a pre-boot environment;
    determining whether the peripheral device has a callable interface for a corresponding configuration utility;
    providing a user interface which allows a user to select configuration of a device with a callable interface, the user interface further notifying the user of configuration possibilities for configurable devices not having a callable interface.

2. The method as recited in claim 1, wherein devices having a callable interface are compatible with an extensible firmware interface (EFI) standard.

3. The method as recited in claim 1, wherein initializing a peripheral device further comprises:
    identifying a device connected to a system being booted; and
    executing configuration code corresponding to the device, the configuration code residing in non-volatile memory on the device.

4. The method as recited in claim 1, further comprising:
    selecting a menu item indicating configuration of a device corresponding to the menu item is desired;
    automatically executing configuration code corresponding to the device, for devices with a callable interface; and
    executing configuration code corresponding to the device after receiving a user response to a display prompt, for devices without a callable interface.

5. The method as recited in claim 1, further comprising:
    selecting a menu item indicating configuration of a device corresponding to the menu item is desired;
    automatically executing configuration code corresponding to the device, for devices with a callable interface; and executing configuration code corresponding to the device, for devices without a callable interface, wherein the executing is performed automatically using emulated key presses.

6. The method as recited in claim 5, wherein executing configuration code for devices without a callable interface further comprises:
identifying a vendor id for the device;
determining whether the vendor id uses a common key press sequence; and
automatically generating a key press sequence without further user intervention.

7. The method as recited in claim 1, further comprising:
selecting a menu item indicating configuration of a device corresponding to the menu item is desired;
automatically executing configuration code corresponding to the device, for a device having a callable interface; and
for a device not having a callable interface:
identifying a vendor id corresponding to the device;
determining whether the vendor id is associated with a standard key sequence;
if the device has a vendor id associated with a standard key sequence then automatically emulating the standard key sequence by the device manager, and executing configuration code corresponding to the device; and
if the device does not have a vendor id associated with a standard key sequence, then executing configuration code corresponding to the device after receiving a user response to a display prompt.

8. An article of manufacture comprising a machine readable medium having stored thereon instructions that, when executed, cause the machine to:
initialize a peripheral device in a pre-boot environment;
determine whether the peripheral device has a callable interface for a corresponding configuration utility;
provide a user interface which allows a user to select configuration of a device with a callable interface, the user interface further notifying the user of configuration possibilities for configurable devices not having a callable interface.

9. The article as recited by claim 8, wherein devices having a callable interface are compatible with an extensible firmware interface (EFI) standard.

10. The article as recited by claim 8, wherein initializing a peripheral device further comprises instructions causing a machine to:
identify a device connected to a system being booted; and
execute configuration code corresponding to the device, the configuration code residing in non-volatile memory on the device.

11. The article as recited by claim 8, further comprising instructions to cause the machine to:
enable selection of a menu item indicating configuration of a device corresponding to the menu item is desired;
automatically execute configuration code corresponding to the device, for devices with a callable interface; and
execute configuration code corresponding to the device after receiving a user response to a display prompt, for devices without a callable interface.

12. The article as recited by in claim 8, further comprising instructions to cause the machine to:
select a menu item indicating configuration of a device corresponding to the menu item is desired;
automatically execute configuration code corresponding to the device, for devices with a callable interface; and
execute configuration code corresponding to the device, for devices without a callable interface, wherein the executing is performed automatically using emulated key presses.

13. The article as recited in claim 12, wherein executing configuration code for devices without a callable interface further comprises instructions causing a machine to:
identify a vendor id for the device;
determine whether the vendor id uses a common key press sequence; and
automatically generate a key press sequence without further user intervention.

14. The article as recited in claim 8, further comprising instructions causing a machine to:
select a menu item indicating configuration of a device corresponding to the menu item is desired;
automatically execute configuration code corresponding to the device, for a device having a callable interface; and
for a device not having a callable interface:
identify a vendor id corresponding to the device;
determine whether the vendor id is associated with a standard key sequence;
if the device has a vendor id associated with a standard key sequence then automatically emulating the standard key sequence by the device manager, and executing configuration code corresponding to the device; and
if the device does not have a vendor id associated with a standard key sequence, then execute configuration code corresponding to the device after receiving a user response to a display prompt.

15. A system for configuring hardware devices in a pre-boot environment, comprising:
a processor having memory, input means and display means;
at least one peripheral device operatively connected to the processor, the at least one peripheral device having non-volatile memory for storing associated configuration code; and
a user interface running on the processor, wherein the user interface identifies configurable peripheral devices connected to the processor, determines whether a configurable peripheral device has a callable interface, and displays a menu on the display means, the menu allowing a user to select a device for configuration using the input means.

16. The system as recited in claim 15, wherein the user interface executes configuration code residing on a peripheral device in response to user selection of a corresponding menu item.

17. The system as recited in claim 15, wherein the user interface enables execution of configuration code of a peripheral device by the pre-boot environment in response to user selection of a corresponding menu item.

18. The system as recited in claim 15, wherein the user interface determines whether a device selected for configuration, the device not having a callable interface, has an associated standard key press sequence, and if so, then automatically generating the associated standard key press sequence.

19. The system as recited in claim 18, wherein the generation of the associated standard key press sequence enables execution of configuration code of a peripheral device by the pre-boot environment.

* * * * *